US012592470B2

(12) United States Patent
Bjørk

(10) Patent No.: US 12,592,470 B2
(45) Date of Patent: Mar. 31, 2026

(54) ANALOG VECTOR SUMMING DEVICE

(71) Applicant: Tas Lobe Invest AS, Kristiansand S (NO)

(72) Inventor: Stig Arne Bjørk, Kristiansand S (NO)

(73) Assignee: Tas Lobe Invest AS, Kristiansand S (NO)

( * ) Notice: Subject to any disclaimer, the term of this patent is extended or adjusted under 35 U.S.C. 154(b) by 93 days.

(21) Appl. No.: 18/608,101

(22) Filed: Mar. 18, 2024

(65) Prior Publication Data

US 2025/0141113 A1 May 1, 2025

(30) Foreign Application Priority Data

Oct. 30, 2023 (GB) ...................................... 2316593
Oct. 30, 2023 (NO) .................................... 20231156

(51) Int. Cl.
*H01P 5/18* (2006.01)

(52) U.S. Cl.
CPC .................................... *H01P 5/185* (2013.01)

(58) Field of Classification Search
CPC .... H01P 5/12; H01P 1/207; H01P 1/36; H01P 5/185; H01P 5/08; H01P 5/103; H01P 5/187; H01P 1/10; H01P 1/218; H01P 5/04; H01P 5/18; H01P 1/2138; H01P 1/215; H01P 1/184; H01P 3/16; H01P 5/107; H01P 5/16; H01P 5/184; H01P 5/20; H01P 1/173; H01P 1/18; H01P 1/2053; H01P 1/32; H01P 1/387; H01P 5/02; H01P 5/10; H01P 5/182; H01P 7/04; H01P 7/06; H01P 7/082; H01Q 1/246; H01Q 25/008; H01Q 3/40; H01Q 1/46; H01Q 3/24; H01Q 3/38; H01Q 1/28; H01Q 13/24; H01Q 17/00; H01Q 19/06; H01Q 19/18; H01Q 25/00; H01Q 3/00; H01Q 3/005; H01Q 3/01; H01Q 3/267; H01Q 3/2676; H01Q 3/34; H01Q 1/38; H01Q 1/50; H01Q 21/00; H01Q 21/0006; H01Q 21/061; H01Q 21/065; H01Q 21/24; H01Q 21/245; H01Q 21/28; H01Q 3/08; H01Q 3/26; H01Q 3/2605; H01Q 3/30; H01Q 3/36; H01Q 9/0407
See application file for complete search history.

(56) References Cited

U.S. PATENT DOCUMENTS 4,757,286 A * 7/1988 Konishi ................. H01P 1/203
333/204
5,021,748 A 6/1991 Chang et al.
(Continued)

OTHER PUBLICATIONS

Search Report issued in connection with British Patent Application No. GB2316593.9, Apr. 25, 2024, 1 page.
(Continued)

*Primary Examiner* — John W Poos
(74) *Attorney, Agent, or Firm* — Duane Morris LLP

(57) ABSTRACT

An analog vector summing device including a microwave line that has a first end and a second end that are electrically part of the microwave line; an output line that comprises a coupling line that is electromagnetically coupled to the microwave line across a gap, wherein the output line further comprises an output end which is electrically part of the output line, to provide a signal which represents the vector sum of the respective signals at the input ends.

5 Claims, 2 Drawing Sheets

(56) References Cited

U.S. PATENT DOCUMENTS

Figure 1:
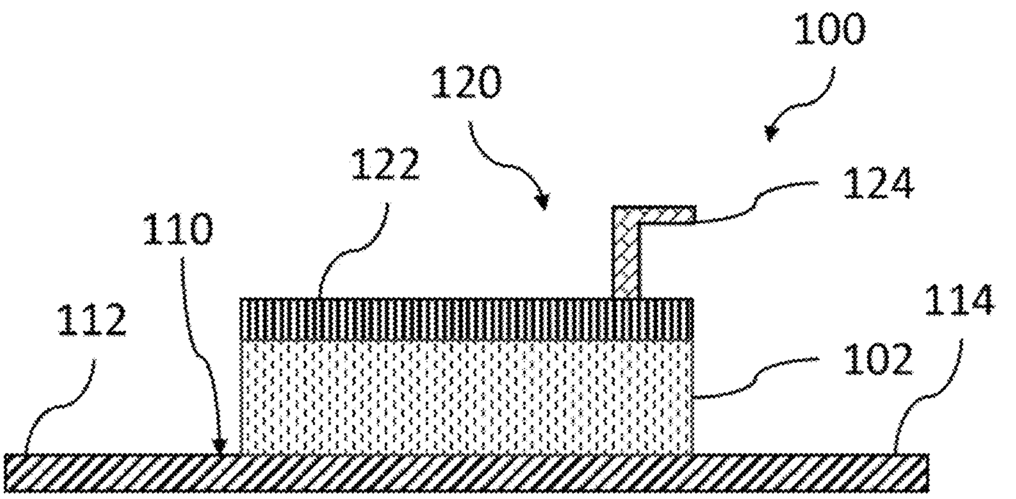

| | | | | |
|---|---|---|---|---|
| 5,493,521 | A | 2/1996 | Oota | |
| 8,013,795 | B2 * | 9/2011 | Washiro | H02J 50/80 343/700 MS |
| 2010/0117755 | A1 * | 5/2010 | Hamada | H01P 5/10 333/4 |
| 2010/0238081 | A1 * | 9/2010 | Achour | H01Q 1/38 343/753 |

OTHER PUBLICATIONS

Akbar, et al., "A New Integrated K-Band Analog Vector Sum Phase Shifter,", 2018 IEEE/MTT-S International Microwave Symposium, Philadelphia, PA, 2018, pp. 1441-1444, 4 pages.

Zheng, et al., "Full 360 Vector-Sum Phase-Shifter for Microwave System Applications," IEEE Transactions on Circuits and Systems I: Regular Papers, vol. 57, No. 4, Apr. 2010, pp. 752-758, 7 pages.

Marki et al., "A Novel Multi-octave Differential Power Divider", Microwave Symposium Digest (MTT), 2010 IEEE MTT-S International, IEEE, May 23, 2010 (May 23, 2010), pp. 1548-1551, Piscataway, NJ, USA.

Wan-Kyu e al., "A Passive Circulator with High Isolation using a Directional Coupler for RFID", Microwave Symposium Digest, 2006. IEEE MTT-S International, IEEE, PI, Jun. 1, 2006 (Jun. 1, 2006), pp. 1177-1180.

International Search Report and Written Opinion for issued in connection with PCT/NO2024/050232 mailed Feb. 19, 2025.

Wikipedia page describing Magic tee, https://en.wikipedia.org/w/index.php?title=Magic_tee&oldid=1168059316, Jul. 31, 2023.

Aikawa et al., "A New MIC Magic-T Using Coupled Slot Lines," Journals & Magazines, IEEE Transactions on Microwave Theory & Techniques 28:6 (1980).

International Preliminary Report on Patentability, dated Jan. 30, 2026, in related International Patent Application No. PCT/NO2024/050232.

* cited by examiner

ANALOG VECTOR SUMMING DEVICE

INTRODUCTION

The invention relates to analog microwave components in general and more specifically a system and a method for analog vector summing of electrical signals having a magnitude and a phase.

BACKGROUND OF THE INVENTION

State of the art is reflected in analog electronics such as summing circuits, typically using operational amplifiers (op-amps) and modulation circuits using non-linear components. There are also digital solutions, where signals are converted to digital form and are processed in a digital signal processor before being converted to analog form. Analog summing circuits and digital solutions are often complex or expensive, especially at microwave frequencies.

According to the abstract, U.S. Pat. No. 5,021,748 A discloses an electromagnetic signal processor comprising an input waveguide, an intermediate waveguide, and an output waveguide.

According to the abstract, U.S. Pat. No. 5,493,521 A discloses a vector calculation apparatus, where a vector adder produces an adder output signal (E) by calculating a three-term sum of a first, a second, and a third adder input signal which are produced in accordance with the adder output signal, a predetermined value ("0"), a first vector (A), and a second vector (B) under control of a control circuit.

There is therefore a need for a method and a system to overcome the above mentioned problems.

BRIEF FIGURE CAPTIONS

Figure 2:
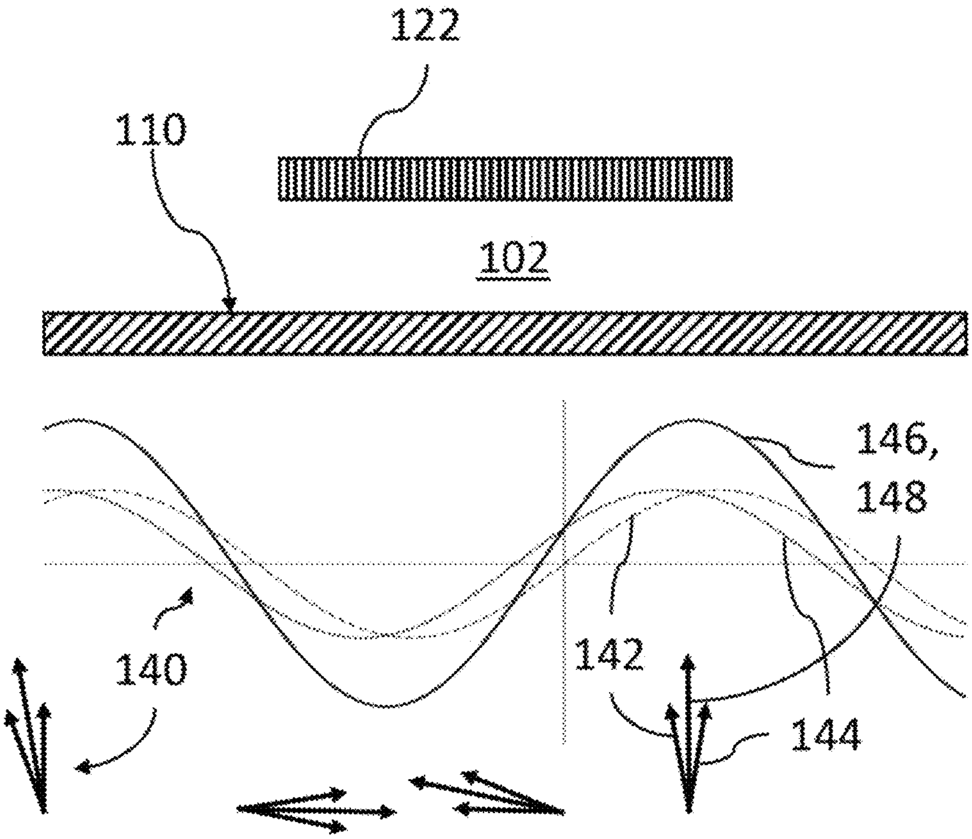
Figure 3:
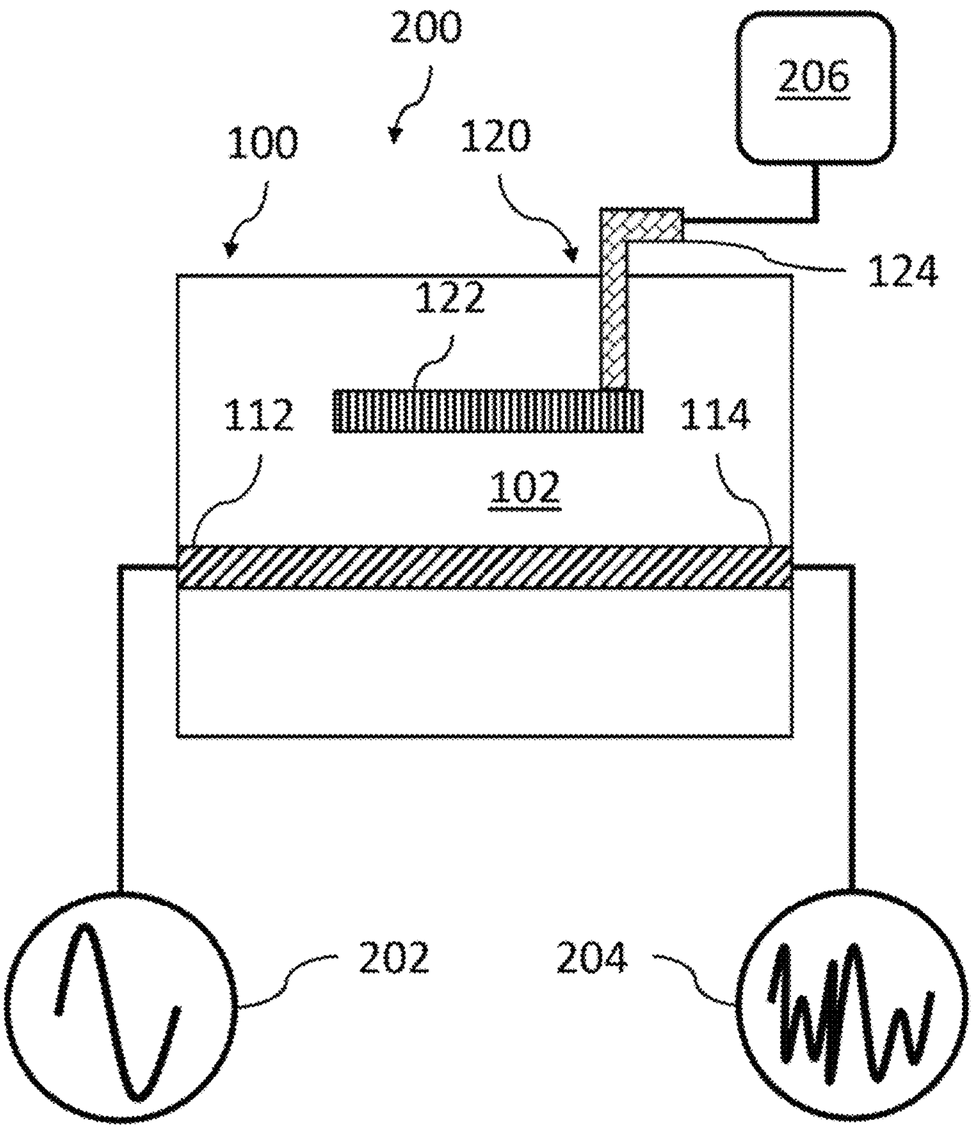

Embodiments of the invention are illustrated in the attached drawing Figures, wherein FIG. 1 illustrates an embodiment of the analog vector summing device, FIG. 2 illustrates an example of phase and magnitude across the device, and FIG. 3 illustrates an example application of an embodiment in a test system.

EMBODIMENTS OF THE INVENTION

Summary of the Invention

The invention is defined in the present independent claims and embodiments are described below.

Objectives of the Invention

One objective of the present invention is to provide a system and a method for analog vector summing of electrical signals having a magnitude and a phase using an analog vector summing device. The objective is achieved according to the invention by an analog vector summing device as described in claim 1. A number of non-exhaustive embodiments, variants or alternatives of the invention are defined by the dependent claims.

The present invention attains the above-described objective by a microwave line having two ends, wherein signals to be summed enter the microwave line at the respective ends.

In a first aspect, an analog vector summing device is provided, comprising a microwave line that comprises a first end and a second end that are electrically part of the microwave line, wherein the microwave line (110) has a length that provides a standing wave for respective signals at the input ends, an output line that comprises a coupling line that is electromagnetically coupled to the microwave line across a gap, wherein the output line further comprises an output end which is electrically part of the output line, to provide a signal which represents the vector sum of the respective signals at the input ends. Specifically, the output represents the sum of the amplitudes where the phase is the arithmetic mean of the phases.

In a preferred embodiment, the microwave line has a length corresponding to half of a largest wavelength of the signals at the input ends. This allows for standing waves that can be picked up by the coupling line.

In a preferred embodiment, the coupling line has a length corresponding to a half of a largest wavelength of the signals at the input ends.

In an unclaimed embodiment, the coupling line has a length corresponding to a quarter of a largest wavelength of the signals at the input ends. This avoids standing waves appearing on the coupling line itself, and reduces any capacitive loading on the microwave line.

In an unclaimed aspect, an acoustic analog vector summing device is provided, comprising an acoustic line that comprises a first end and a second end that are acoustically part of the acoustic line, an output line that comprises a coupling line that is acoustically coupled to the acoustic line across a gap, wherein the output line further comprises an output end which is acoustically part of the output line, to provide a signal which represents the vector sum of the respective signals at the input ends. This means the output line acts as a microphone for the entire length of the acoustic line.

In a preferred embodiment, the coupling line uses piezoelectric effects to couple acoustically to the acoustic line.

Effects of the Invention

The present invention comprises a technological advantage over known systems and methods by use of a microwave line, in that it uses a passive microwave line to perform the vector summation.

The present invention provides several further advantageous effects:

- it makes it possible to sum signals having a large bandwidth,
- it avoids using active components and the related power consumption,
- it is easily fabricated, and
- it is mechanically robust.

DETAILED DESCRIPTION OF THE INVENTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Principles Forming the Basis of the Invention

The inventor has recognized that a passive microwave line system can be used to perform analog vector summing of two signals.

The term "microwave line" is used as a general term and encompasses both the well-known terms "microstrip" and "stripline". The disclosed technology can also be used at lower frequencies, but as if often the case with microwave technologies, the device would have to be infeasibly large when applied to signals having frequencies less than 300 MHz.

FIG. 1 shows an embodiment of the invention, wherein an analog vector summing unit (100) comprises a microwave line (110) and an output line (120).

The microwave line (110) comprises a first input end (112) and a second input end (114) that are electrically part of the microwave line (110). These ends are electrically connected to the signal sources for vector summing. The microwave line is within the analog summing unit, and is preferably about half a wavelength long, wherein the wavelength is the longest wavelength appearing in both of the input signals. A standing wave will therefore appear on the microwave line. Nevertheless, a perfect resonance is not required, so there is a wide tolerance which translates into a wide bandwidth of operations.

The output line (120) comprises a coupling line (122) that is electromagnetically coupled to the microwave line (110) across a gap (102). The output line further comprises an output end (124) which is electrically part of the output line. This output end (124) provides a signal which represents the vector sum of the respective signals at the input ends (122, 124). The output end (124) can be any means for taking the signal from the coupling line, such as a conductive line on a printed circuit board and a wire.

The coupling line (122) should preferably be about half the length of the wavelength. This is long enough to pick up a sufficient signal from the microwave line without being so long that standing waves start appearing on the coupling line itself. The coupling line, it has been found, will pick up the strongest amplitude of the sum of the two input signals along the microwave line.

FIG. 2 shows an example of phase and magnitude across the device. This is illustrated as phasors (140) across the lines. Phasor (142) represents the signal entering from the first input end of the microwave line, while phasor (144) represents the signal entering from the second input end of the microwave line. These are superimposed on the microwave line, but are picked up as a sum of vectors by the coupling line, as illustrated by the coupling line phasor (146), where the phase is the arithmetic mean of the input phasors (142, 144). This signal is brought out of the device at the output end (124) as represented by the output end phasor (148).

FIG. 3 shows an example application of an embodiment in a test system. In such a typical measurement system (200), sources (202, 204) are connected to input ends (122, 124), and a sensor (206) or measurement device is connected to the output end (124). In typical scenarios a signal source or a device under test is used at one input and a noise source is fed into the other input, and the output is connected to an oscilloscope or receiver to determine noise sensitivity.

Design parameters are chosen by the following considerations:

Microwave line length: about half the wavelength of the input signals, preferably just over half a wavelength of the longest wavelength that appears in either input signal.

Gap: this can be quite small, but preferably sufficiently large to avoid capacitive loading on the input signals.

Coupling line: about half the length of the wavelength of the longest wavelength that appears in either input signal.

Ground plane: this is not required for the analog summing unit itself, but is in practice determined whether it is needed or not to limit any impedance mismatch between the outside and the inside of the analog summing unit.

BEST MODES OF CARRYING OUT THE INVENTION

The embodiment of the apparatus according to the invention shown in FIGS. 1, 2 and 3 comprises microwave lines in the form of Cu traces on a glass fiber reinforced epoxy board, in a typical FR-4 embodiment. These materials are suited for frequencies up to a few GHz, depending on quality.

The microwave line is shown as a straight line and can be fabricated like normal printed circuit boards (PCB) with copper traces on epoxy. As one exemplary embodiment, for working with microwave signals at 3 GHZ, the microwave line is 5 cm long, the gap is 1 cm across and the coupling line is 2.5 cm long.

Alternative Embodiments

A number of variations on the above can be envisaged. For instance, while the microwave lines illustrated are shown as straight lines, also other geometries can be used and still operate within the scope of the invention.

While the figures show the microwave line and the output line in the same plane, one can also design this using a multi-layer printed circuit board with the microwave line and the output line on opposite sides of the board.

The inventor has also realized that the principle of the invention can also be equally well applied to ultrasonics. In this case the microwave lines can be replaced with surface acoustic waves on a SAW device, wherein a pickup is acoustically connected to the SAW device, for instance by a piezoelectric device.

COMPONENTS LIST

| | |
|---|---|
| 100 | Analog vector summing unit |
| 102 | Gap |
| 110 | Stripline, microwave line |
| 112 | First end of stripline, microwave line, first input end |
| 114 | Second end of stripline, microwave line, second input end |
| 120 | Output line |
| 122 | Coupling line |
| 124 | Output end |
| 140 | Phasors |
| 142 | First end input phasors |
| 144 | Second end input phasors |

-continued

| | |
|---|---|
| 146 | Coupling line phasor |
| 148 | Output end phasor |
| 200 | Measurement system |
| 202 | Signal source, device under test |
| 204 | Noise source |
| 206 | Sensor |

The invention claimed is:

1. An analog vector summing device, comprising:

a microwave line that comprises a first input end and a second input end that are electrically part of the microwave line, wherein the first input end and the second input end are configured to be connected with a first signal source and a second signal source, respectfully, and the microwave line has a length that provides a standing wave for respective signals at the input ends; and an output line that comprises a coupling line being separate from the microwave line through a gap, the coupling line being electromagnetically coupled to the microwave line across the gap, wherein the output line further comprises an output end which is electrically part of the output line, the output end providing a signal which represents the vector sum of the respective signals at the input ends.

2. The analog vector summing device according to claim 1, wherein the microwave line has a length corresponding to half of a largest wavelength in the signals at the input ends.

3. The analog vector summing device according to claim 2, wherein the coupling line has a length corresponding to half of a largest wavelength of the signals at the input ends.

4. The analog vector summing device according to claim 1, wherein the microwave line is a passive microwave line.

5. The analog vector summing device according to claim 1, wherein the respective signals are at microwave frequencies.

* * * * *